United States Patent [19]

Maeda et al.

[11] Patent Number: 5,379,288
[45] Date of Patent: Jan. 3, 1995

[54] OPTICAL INFORMATION RECORDING MEDIUM AND A REPRODUCING APPARATUS FOR THE RECORDING MEDIUM

[75] Inventors: Takanori Maeda; Noriaki Murao, both of Tokorozawa, Japan

[73] Assignee: Pioneer Electronic Corporation, Tokyo, Japan

[21] Appl. No.: 25,644

[22] Filed: Mar. 3, 1993

[30] Foreign Application Priority Data

Apr. 13, 1992 [JP] Japan ................... 4-092700

[51] Int. Cl.⁶ ..................... G11B 7/26; G11B 11/18
[52] U.S. Cl. ..................... 369/275.4; 369/275.3; 369/124
[58] Field of Search ............ 369/44.24, 44.34, 108, 369/275.4, 275.3, 112, 124

[56] References Cited

U.S. PATENT DOCUMENTS

| | | | |
|---|---|---|---|
| 4,118,734 | 10/1978 | Bouwhuis et al. | 369/275.3 |
| 4,475,183 | 10/1984 | Marchant et al. | 369/275.4 |
| 4,477,891 | 10/1984 | Gorog | 369/109 |
| 5,045,868 | 9/1991 | Tajima | 369/44.24 |
| 5,283,778 | 2/1994 | Maeda | 369/112 |

OTHER PUBLICATIONS

Patent Abstracts of Japan vol. 9, No. 214 (P-384) Aug. 1985 (JPA 60-074 123).

Patent Abstracts of Japan vol. 5, No. 113 (P-089) Nov. 13, 1981 (JPA 56-107 308).

*Primary Examiner*—Paul M. Dzierzynski
*Assistant Examiner*—Kim-Kwok Chu
*Attorney, Agent, or Firm*—Sughrue, Mion, Zinn, Macpeak & Seas

[57] ABSTRACT

An optical information recording medium, to and from which information can be recorded or reproduced at a high density, uses more number of kinds of pits than those of a conventional optical disc. A reproducing apparatus for such a medium also is devised. Information is recorded onto the recording medium by using a plurality of pit lengths which are obtained by dividing a whole frequency band below a cut-off frequency of MTF characteristic of a reproducing system into a plurality of bands in correspondence to the band characteristic and by allocating a plurality of spatial frequencies to the divided bands. The reproducing apparatus of the invention comprises an optical pickup to read out the recording information from the optical recording medium and signal demodulating means for demodulating the original data from the pulse width and amplitude value of the reproduction signal which is supplied from the optical pickup, wherein the optical pickup is designed to have an MTF characteristic such as to have one or a plurality of peaks at certain frequency positions.

9 Claims, 14 Drawing Sheets

FIRST APERTURE DIAPHRAGM

SECOND APERTURE DIAPHRAGM

OPTICAL INFORMATION RECORDING MEDIUM AND A REPRODUCING APPARATUS FOR THE RECORDING MEDIUM

BACKGROUND OF THE INVENTION

1. Field of the Invention

The present invention relates to an optical information recording medium and a reproducing apparatus for the recording medium.

2. DESCRIPTION OF BACKGROUND INFORMATION

For the retrieval of recording information from an optical information recording medium (hereinafter, referred to as an "optical disc"), an optical system called optical pickup is widely used. A laser beam is converged to a spot-shape by an objective lens and is irradiated onto the optical disc. The irradiated laser beam is subjected to an intensity modulation by depressions called pits formed on the optical disc and the reflected light from the pit is again converged by the objective lens. The light intensity of the reflected light is photoelectrically converted by a photodetector, thereby reading of the recording information is performed.

FIG. 1 shows a construction of an optical pickup of a conventional optical disc reproducing apparatus. FIG. 2 shows a construction of a demodulating circuit.

In FIG. 1, reference numeral 51 denotes a semiconductor laser provided as a light source. Similarly reference numerals 52, 53, 54, and 55 denote a half mirror; an objective lens, a photodetector and an optical disc, respectively. In FIG. 2, reference numerals 61, 62, and 63 respectively denote a limiting circuit for converting an output signal of the photodetector 54 into a pulse train signal, a pulse width detector for measuring the pulse width of each pulse, and a data demodulator for demodulating the original digital data in accordance with a predetermined processing procedure.

As shown in an example of FIG. 3, the length of each pit which is recorded on the optical disc 55 is determined to be a value which is an integer times as long as a unit period (hereinafter, referred to as a "reference clock unit") T of a reference clock. The signal generated from the photodetector 54 of an optical pickup is sliced by the limiting circuit 61 on the basis of the center level of the amplitude and is converted into the pulse train signal. The pulse train signal is supplied to the pulse width detector 62, by which a pulse width of each pulse is detected. The data demodulator 63 demodulates the original data by examining that the pulse width corresponds to what number of times of the reference clock unit T.

The objective lens 53 of the conventional optical pickup has a circular opening. A spatial frequency transmitting characteristic (Modulation Transfer Function characteristic; hereinafter, referred to as "MTF characteristic") of the optical pickup using such a circular opening is as shown in FIG. 4. In case the conventional optical pickup is used, the following waveform distortion occurs due to imperfectness of the optical system at the i-th slice crossing point $u_i$.

$$\Delta g(u_i) = g(u_i) - g_0(u_i) \quad (1)$$

where $g_0$ represents reproduction signal of the optical system having no aberration, and g represents actual reproduction signal.

When the waveform distortion $\Delta g(u_i)$ occurs, a deviation in the time base directions, that is, a jitter occurs in the signal waveform. A jitter amount in this instance is obtained by the following equation.

$$\Delta J(u_i) = -\Delta g(u_i)/g_0'(u_i) \quad (2)$$

where, $g_0'(u_i)$ represents gradient at the $u_i$ position of $g_0$.

Although the jitter occurs by the waveform distortion due to the imperfectness of the optical pickup as mentioned above, the jitter amount is inversely proportional to a gradient $g_0'$ as will be readily understood from the equation (2). Therefore, if the optical pickup having the MTF characteristic as shown in FIG. 4 is used and the pulse width of the output signal is judged from only the time base, the signal cannot be inserted above a relatively low spatial frequency region in which the value of the gradient $g_0'$ is not so small. As a recording system, further, it is necessary to set the reference clock unit T which gives the quantization step of the pulse width to $T > 2\Delta J$ in a manner such that no reading error occurs in the demodulated signal even if a jitter is generated.

When the spatial frequency is limited as mentioned above, the kind of pit lengths which can be inserted in the limited spatial frequency region is limited and the reference clock unit T cannot also be reduced, so that a problem arises that a high density recording is difficult. For instance, in case of a CD system which is known as a compact disc, the usable spatial frequency lies within a frequency range within a frequency value about ½ the cut-off frequency of the modulation transfer function. As a result, only nine kinds of pits in a pit length range, from the shortest pit length 3T to the maximum pit length 11T, can be used.

SUMMARY AND OBJECTS OF THE INVENTION

The invention has been made on the basis of the above described circumstances and it is an object of the invention to provide an optical information recording medium on or from which information can be recorded or reproduced at a high density by using more kinds of pits than those of a conventional optical disc, and also to provide a reproducing apparatus for such a recording medium.

To accomplish the above object, according to an optical information recording medium of the present invention, information is recorded by using a plurality of pit lengths which are obtained by dividing a whole frequency band below a cut-off frequency of the MTF characteristic of a reproducing system into a plurality of bands in correspondence to the band characteristic and by allocating a plurality of spatial frequencies to the divided bands.

According to the present invention, there is provided an optical information recording medium, reproducing apparatus for reproducing the above optical information recording medium, wherein the reproducing apparatus comprises: an optical pickup to read out recording information from the optical recording medium; and signal demodulating means for demodulating original data from a pulse width and an amplitude value of a reproduction signal that is generated from the optical pickup, wherein the optical pickup has an MTF characteristic having one or a plurality of peaks at certain frequency positions.

In an optical information recording medium of the present invention, the pit lengths for recording are set so as to enable the use of the whole frequency band below the cut-off frequency of the MTF characteristic of the reproducing system. Therefore, information can be recorded by using a large number of kinds of the pit and a high density recording can be performed as compared with the case of the conventional optical disc. In the optical information recording medium reproducing apparatus of the invention, the signal read out from the optical information recording medium is demodulated by using two values such as pulse width and amplitude value. As compared with the conventional apparatus which detects the pit length from only the time base, therefore, an allowance degree for a jitter is higher than that of the conventional apparatus which detects a pit length from only the time base, and many kinds of pit lengths which have been recorded at a high density can be reproduced without errors.

DETAILED DESCRIPTION OF THE EMBODIMENTS

Figure 5:
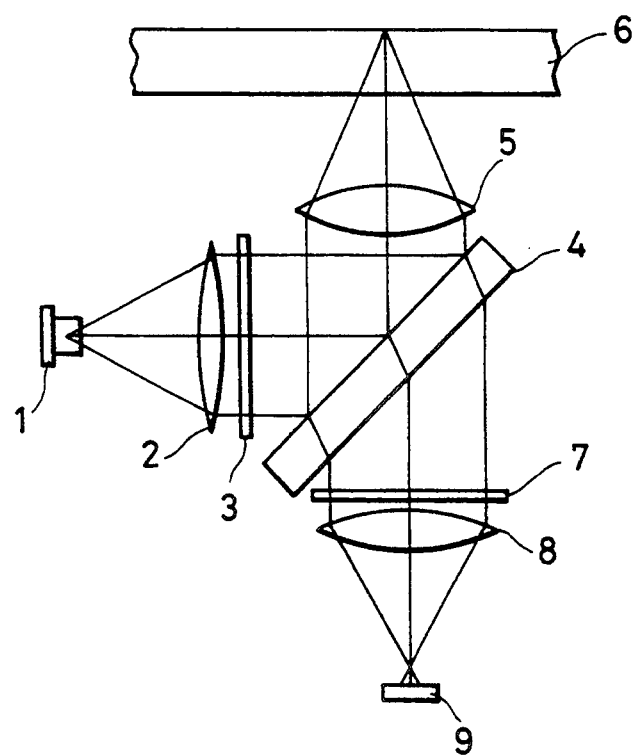
FIG. 5 is a diagram showing the first embodiment of an optical pickup of a reproducing apparatus according to the present invention.

FIG. 5 shows the first embodiment of an optical pickup of a reproducing apparatus according to the present invention.

In the diagram, the reference numeral 1 denotes a semiconductor laser as a light source, 2 denotes a collimator lens, 3 denotes a first aperture diaphragm to limit the light of the semiconductor laser 1 in the signal modulating direction, 4 denotes a half mirror to separate the incident light to an optical disc and the reflected light from the optical disc, 5 denotes an objective lens, 6 denotes an optical disc on which information has been recorded, 7 denotes a second aperture diaphragm to limit an aperture of the reflected light from the optical disc, 8 denotes a multi-lens to give an astigmatism to detect a focal point, and 9 denotes a photodetector.

Figure 6A:
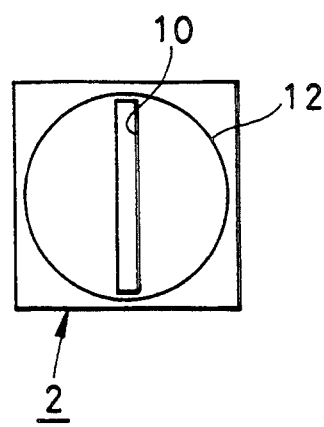
FIGS. 6A and 6B are diagrams showing aperture patterns of the first embodiment.
Figure 6B:
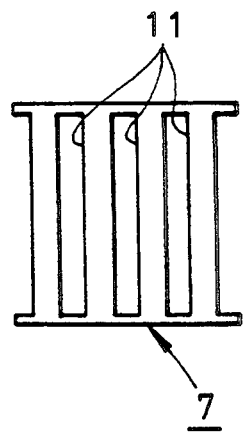

FIGS. 6A and 6B shows aperture patterns of the first and second aperture diaphragms 3 and 7 in the first embodiment. The aperture pattern of the first aperture diaphragm 3 shown in FIG. 6A comprises one rectangular slit 10. The aperture pattern of the second aperture diaphragm 7 shown in FIG. 6B comprises a plurality of rectangular slits 11. A circle denoted by reference numeral 12 in FIG. 6A indicates a light beam of a laser light which is emitted from the semiconductor laser 1 and transmitted through the collimator lens 2.

Figure 1:
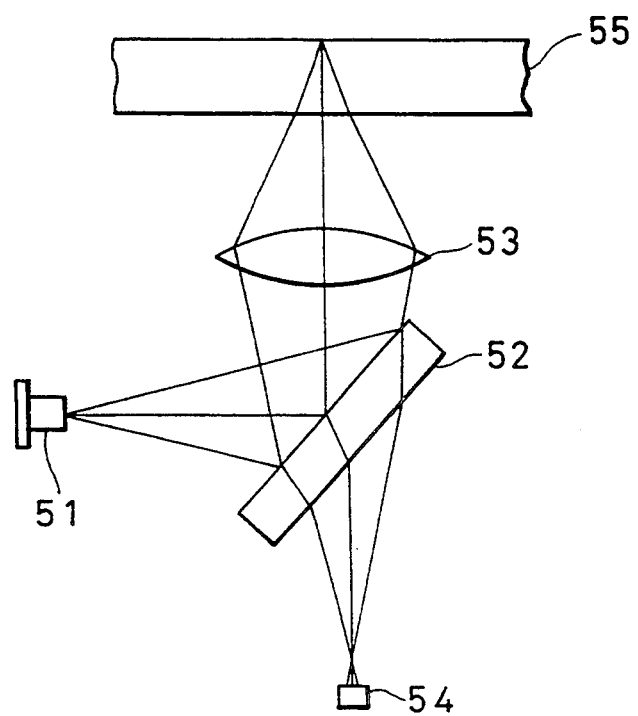
FIG. 1 is a diagram showing a construction of an optical pickup of a conventional reproducing apparatus.
Figure 2:
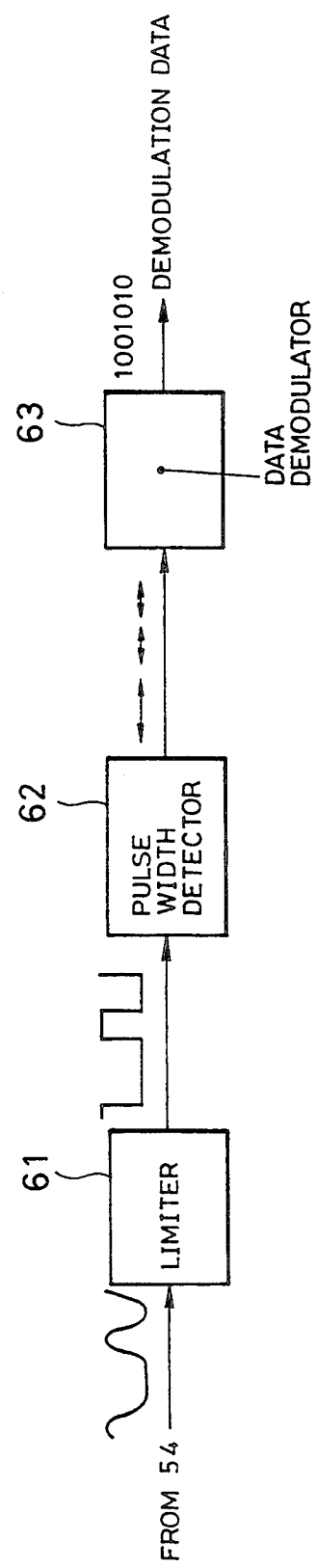
FIG. 2 is a diagram showing a construction of a demodulating circuit of the conventional reproducing apparatus.
Figure 3:
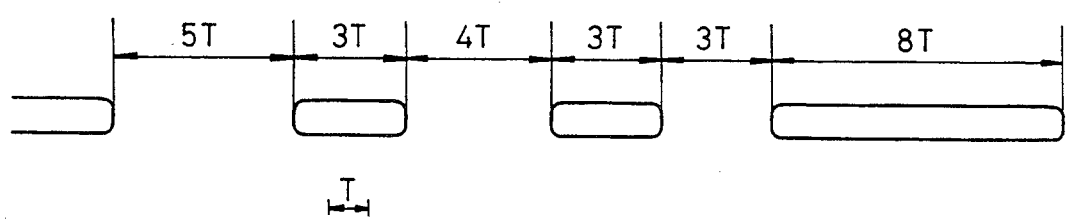
FIG. 3 is a diagram showing an example of recording pits of a conventional optical disc.
Figure 4:
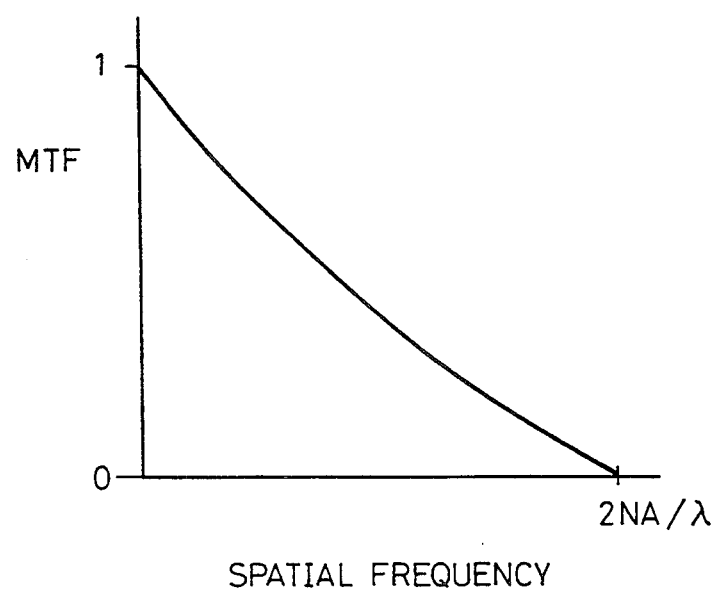
FIG. 4 is a diagram showing the MTF characteristic of a conventional optical pickup.
Figure 7:
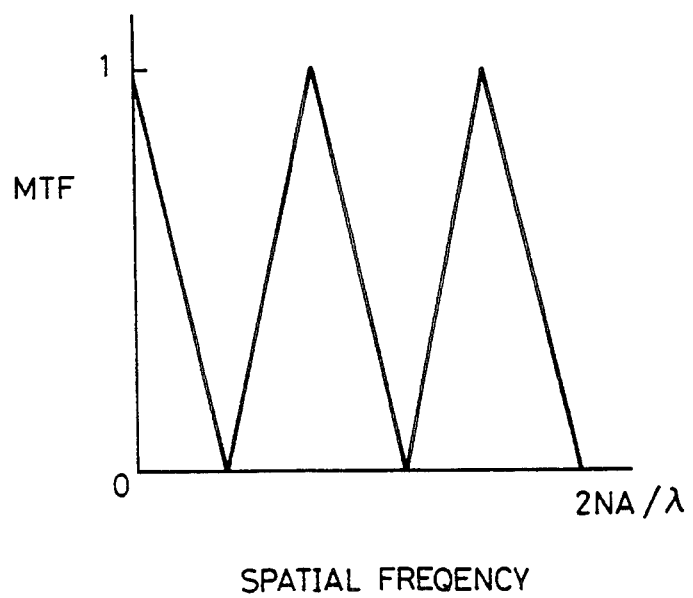
FIG. 7 is a diagram showing the MTF characteristic of the first embodiment.

It is known that the MTF characteristic of the optical pickup changes in accordance with the aperture pattern of the pupil. Assuming that the first and second aperture diaphragms 3 and 7 in FIG. 5 have the circular apertures of the same diameter, the MTF characteristic are substantially the same as the conventional MTF characteristic shown in FIG. 4. However, if the aperture pattern of the first aperture diaphragm 3 has a single slit-like shape as shown in FIG. 6A and the aperture pattern of the second aperture diaphragm 7 has a three-slit-like shape as shown in FIG. 6B, the MTF characteristic as a whole optical pickup becomes as shown in FIG. 7.

This is because when the aperture patterns as shown in FIGS. 6A and 6B are formed, the light diffracted by a certain special spatial frequency particularly efficiently passes through the slit portions and is led to the photodetector 9. The cut-off frequency in the MTF characteristic in FIG. 7 is given by $2NA/\lambda$ if a substantial numerical aperture of the optical pickup in FIG. 5 is set to NA and a wavelength of the laser beam which is used is set to $\lambda$.

In FIGS. 6A and 6B, whether the light (DC component) of the spatial frequency of 0 is reproduced or not is determined in dependence on whether the center portion of each of the aperture diaphragms 3 and 7 is set to an aperture portion or a light shielding portion. Although the present invention can be applied to any one of the above two cases, explanation will now be made hereinafter with respect to the case of using the aperture diaphragm whose center portion is set to the aperture portion as shown in FIG. 6A or 6B. The MTF characteristic in the case where the center portion is formed as an aperture portion are as shown in FIG. 7 mentioned above.

Figure 8:
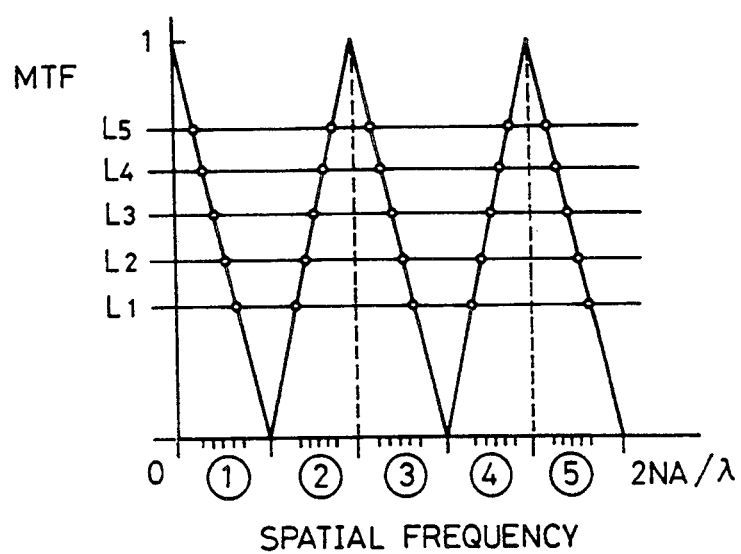
FIG. 8 is a diagram showing an example of allocation of spatial frequencies of the first embodiment.

Lengths of pits which are used in the optical disc of the present invention are mainly classified into a few groups in correspondence to the MTF characteristic. Further, the pit lengths are set by dividing the pit lengths in each group into several subgroups. For instance, in case of the MTF characteristic of FIG. 7, as shown in FIG. 8, the whole band below the cut-off frequency $2NA/\lambda$ is divided into five bands of 1 to 5 while setting the positions of the mountains and valleys of the MTF characteristic to boundaries. Further, in each of the divided bands 1 to 5, by making five spatial frequencies correspond, total 25 kinds of pit lengths are set.

In case of the example of FIG. 8, for the simplification of the level judgment in the reproduction, the spatial frequencies at the positions corresponding to five levels $L_1$ to $L_5$ are used as for the 25 kinds of pits, respectively. The recording information of the optical disc 6 which has been recorded by using the 25 kinds of pits is read out by using the optical pickup shown in FIG. 5 on the basis of the MTF characteristic shown in FIG. 7 and is photoelectrically converted into the electric signal by the photodetector 9. After that, the electric signal is sent to the demodulating circuit.

Figure 9:
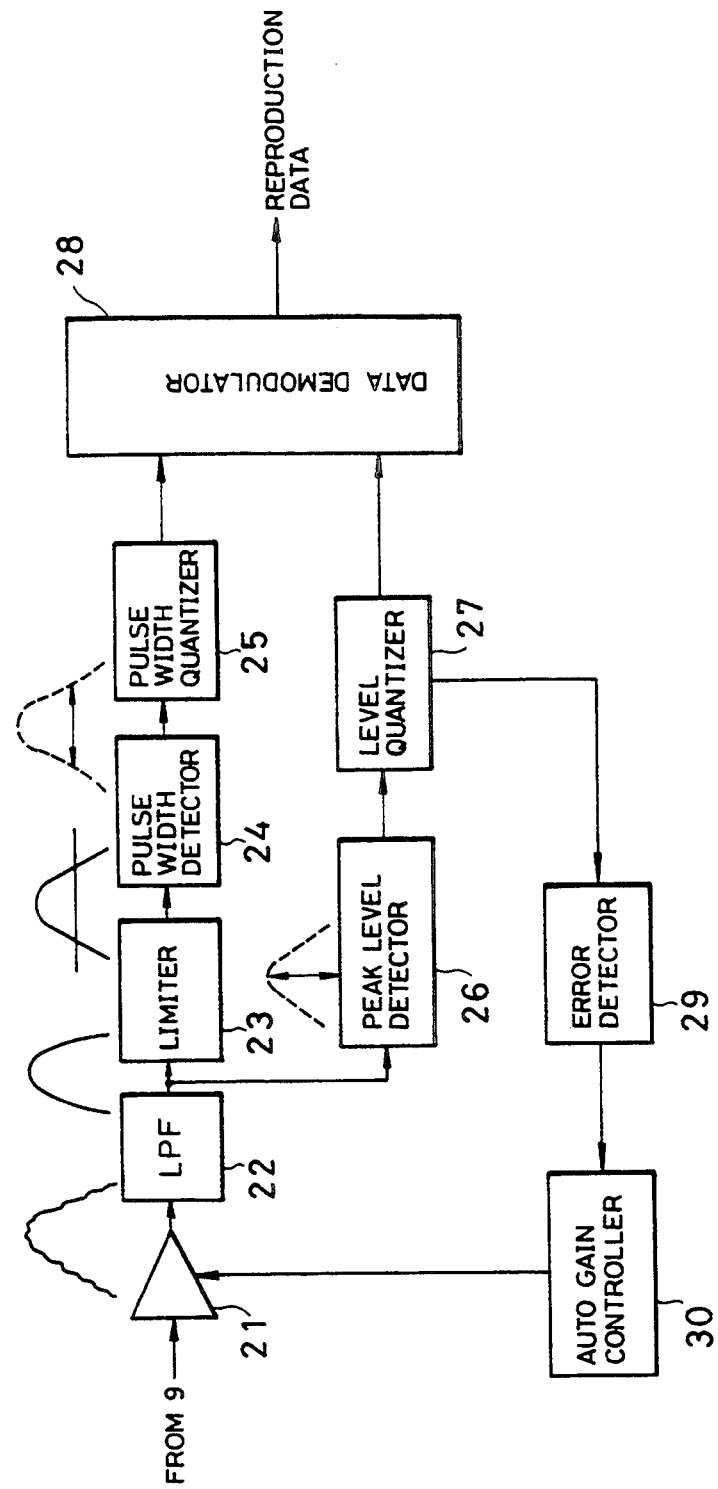
FIG. 9 is a diagram showing the first embodiment of a demodulating circuit of a reproducing apparatus according to the present invention.

FIG. 9 shows the first embodiment of the demodulating circuit of the reproducing apparatus according to the present invention.

In the diagram, reference numeral 21 denotes a variable amplifier; 22 a low pass filter (LPF); 23 a limiting circuit; 24 a pulse width detector; 25 a pulse width quantizing circuit; 26 a peak level detector; 27 a level quantizer; 28 a data demodulator; 29 an error detector; and 30 an auto gain control circuit.

The signal from the photodetector 9 is first amplified by the variable amplifier 21. After that, the noise components of the cut-off frequency or higher are eliminated by the LPF 22. An output signal of the LPF 22 is separated into two signals. One signal is sent to the limiting circuit 23 and the other is sent to the peak level detector 26.

The signal sent to the limiting circuit 23 is sliced at the level center position by the limiting circuit 23 and is converted into the pulse train signal comprising rectangular waves. A pulse width of each pulse of the pulse train signal is detected by the pulse width detector 24 and the signal is quantized by the quantizer 25. After that, the quantized signal is sent to the data demodulator 28.

A peak level of the signal sent to the peak level detector 26 is detected by the peak level detector 26. In this instance, as shown in FIG. 8, since the spatial frequency of each recording pit is set so that the intensity is set to either one of the five levels $L_1$ to $L_5$, the intensity level is subsequently quantized by the level quantizer 7 and is sent to the data demodulator 28.

The data demodulator 28 judges that the pit corresponds to the pit length corresponding to which level in which band of the MTF characteristic of FIG. 8 by using both of the value of the pulse width which is sent from the pulse width quantizer 25 and the value of the peak level of the signal which is sent from the level quantizer 27. The data demodulator 28 demodulates the original digital data in accordance with a predetermined processing procedure on the basis of the judgment.

In the demodulation, if it is possible to decide in which one of the divided bands of 1 to 5 of the MTF characteristic of FIG. 8 the relevant pulse exists by the pulse width which is supplied from the pulse width quantizer 25, it is possible to accurately judge to which spatial frequency in the relevant band the pit corresponds by using the peak level value which is supplied from the level quantizer 27.

The frequency of the reference clock which gives a unit step for the pulse width quantization can, therefore, be set to be lower than the conventional reference clock frequency, so that the value of the allowable jitter can be also set to a large value in correspondence to such a low frequency. As quantization in the quantizer 25, it is also possible to use what is called non-linear quantization such that the quantization step is changed in accordance with the value of the spatial frequency.

The level (amplitude) of the signal which is read out from the optical disc fluctuates because of a waveform distortion due to the noises of the reproducing system or incompleteness of the optical pickup. It is, however, necessary to set the level difference between the levels so that an influence by such a level fluctuation causes no problem in the detection of the peak level. In the above embodiment, the five levels $L_1$ to $L_5$ are used as shown in FIG. 8.

In case of the demodulating circuit of FIG. 9, when the level quantization is executed by the level quantizer 27, to which degree of average error the actual signal level has as compared with the correct signal level to be inherently reproduced can be known. The amplification level, accordingly, can be changed so as to minimize the error.

As shown in FIG. 9, therefore, the error detector 29 and the automatic gain-control circuit 30 are provided, the error is detected by the error detector 29, and an amplification factor of the variable amplifier 21 is controlled by the auto gain control circuit 30 on the basis of the result of the error detection, so that an accurate demodulating process according to the MTF characteristic of FIG. 8 can be realized.

To perform the above-described operations in more simple manner, value of the outputs of the variable amplifier 21 may also be compared with a set value. In place of changing the amplification factor of the variable amplifier 21, the light emission intensity of the semiconductor laser 1 of the optical pickup can be also changed.

Figure 10:
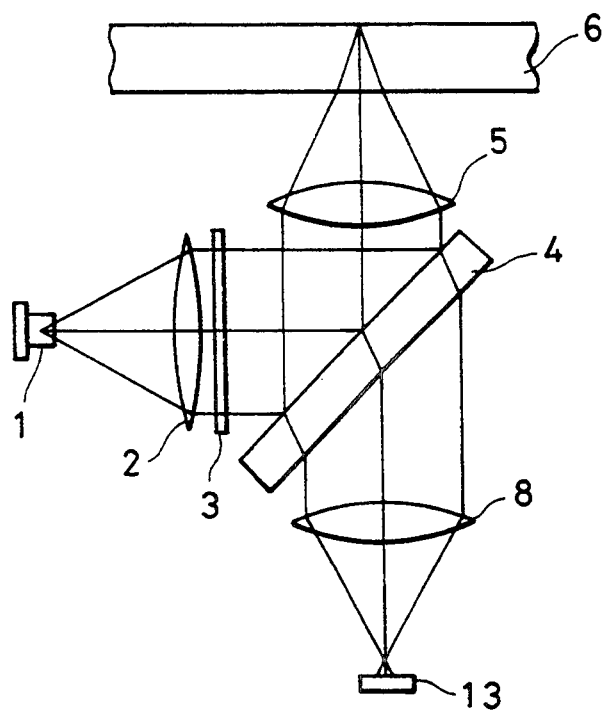
FIG. 10 is a diagram showing the second embodiment of an optical pickup of a reproducing apparatus according to the invention.
Figure 11:
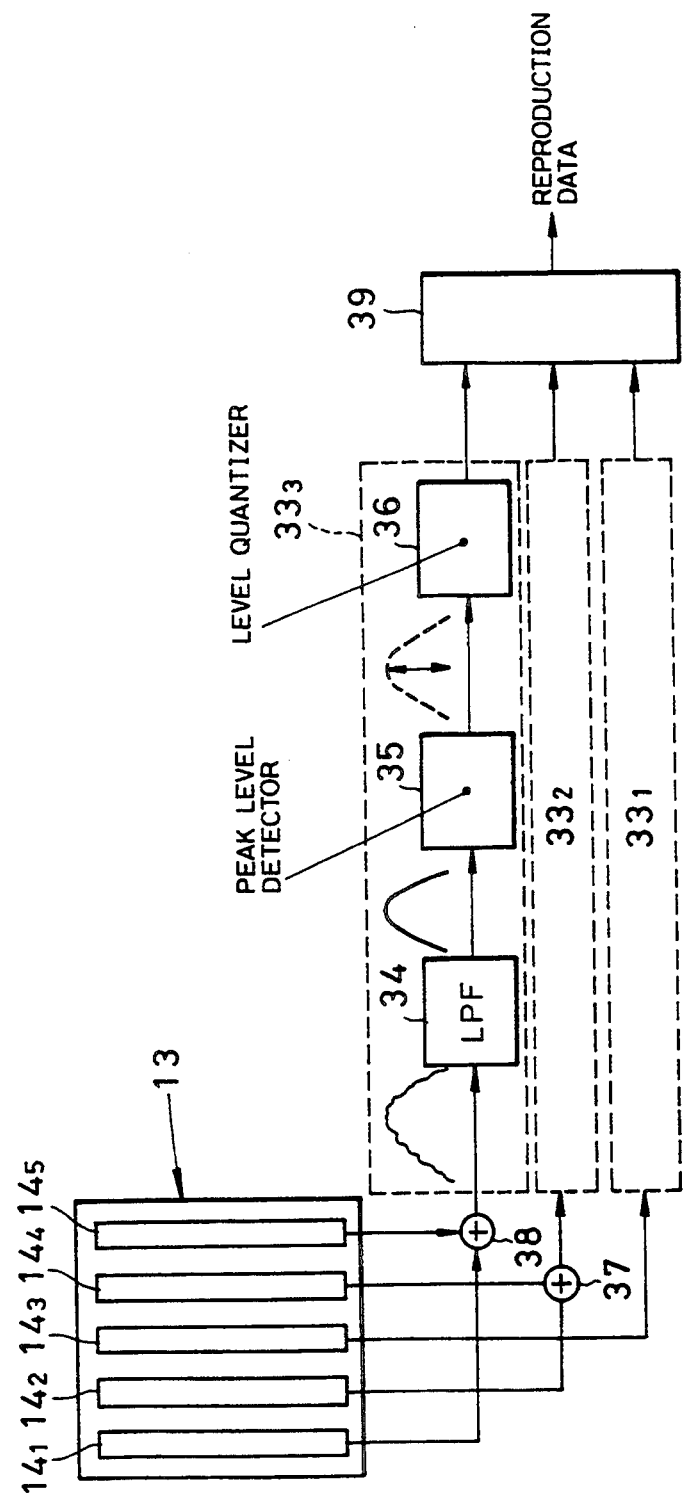
FIG. 11 is a diagram showing the second embodiment of a demodulating circuit of the reproducing apparatus according to the invention.

FIGS. 10 and 11 show the second embodiment of the present invention.

An optical pickup of FIG. 10 has almost the same construction as that first embodiment (FIG. 5) except a different point that the second aperture diaphragm 7 in the first embodiment is omitted and the function of the second aperture diaphragm 7 is performed by the shape of the light receiving surfaces of a photodetector 13.

The detecting surface shape of the photodetector 13 is shown in a demodulating circuit of FIG. 11. Five slit-like photodetecting elements $14_1$ to $14_5$ are arranged at predetermined intervals on the detecting surface of the photodetector 13. The photodetecting elements $14_1$ to $14_5$ correspond to the second aperture diaphragm 7 in the first embodiment but differs from the construction in the first embodiment with respect to a point that signal can be independently taken out from the photodetecting elements. The photodetector 13 is arranged at the position of a far-field pattern such as position of a circle of least confusion due to an astigmatism.

The demodulating circuit of FIG. 11 has three level detecting circuits $33_1$ to $33_3$ having the same circuit construction. Each of the level detecting circuits comprises a low pass filter (LPF) 34, a peak level detector 35, and a level quantizer 36.

An output signal of the photodetecting element $14_3$ is supplied to the first level detecting circuit $33_1$. Output signals of the photodetecting elements $14_2$ and $14_4$ are added by an adder 37. An output signal of the adder 37 is supplied to the second level detecting circuit $33_2$. Output signals of the photodetecting elements $14_1$ and $14_5$ are added by an adder 38. An output signal of the adder 38 is supplied to the third level detecting circuit $33_3$.

In case of the second embodiment, the spatial frequency bands of the signals which are supplied to the level detecting circuits $33_1$ to $33_3$ are automatically determined in accordance with the positions of the photodetecting elements $14_1$ to $14_5$ of the photodetector 13. Therefore, the limiting circuit 23, pulse width detector 24, and pulse width quantizing circuit 25 for the band judgment in the first embodiment are unnecessary.

As for the signal supplied to either one of the level detecting circuits $33_1$ to $33_3$ corresponding to the spatial frequency band, the noise components of the cut-off frequency or higher are eliminated by the low pass filter 34. Subsequently, the peak value is detected by the peak level detector 35 and is quantized by the level quantizer 36. After that, the quantized signal is sent to a data demodulator 39.

The data demodulator 39 is operative to judge the frequency band by checking from which one of the three level detecting circuit $33_1$ to $33_3$ the signal is supplied. On the basis of the peak value, the data demodulator 39 also judges to which one of the spatial frequencies in the frequency band the pit length corresponds. On the basis of the result of the judgment, the data demodulator demodulates the original digital data in accordance with a predetermined processing procedure.

Figure 12:
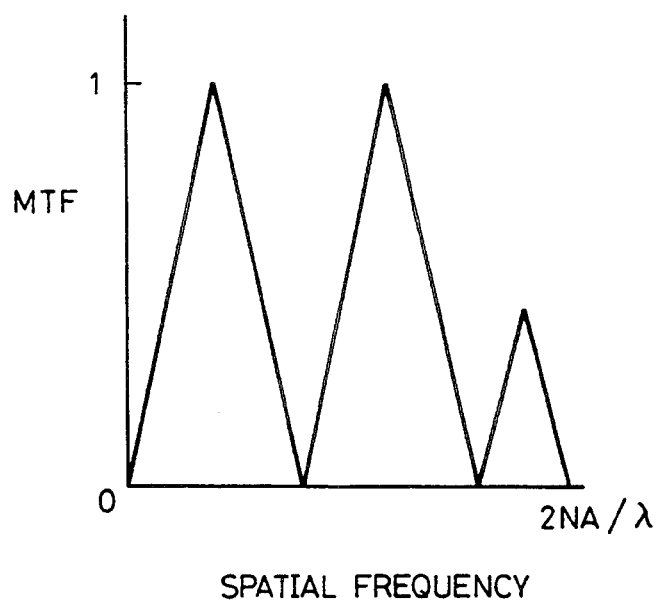
FIG. 12 is a diagram showing the MTF characteristic in the case where the shape of detection surface of a photodetector is changed.

In case of the second embodiment as well, the amplification factor control means comprising the error detector 29 and the auto gain control circuit 30 shown in FIG. 9 can be added. In the second embodiment, the intermediate portion between the respective photodetecting elements $14_1$ to $14_5$ of the photodetector 13 is set to the light shielding portion in which no light is detected. By also setting such an intermediate portion to a photodetecting portion, MTF characteristic as shown in FIG. 12 can be obtained. In case of the MTF characteristic of FIG. 12 as well, the present invention can be applied in a manner similar to that mentioned above.

Although the embodiment has been described above with respect to the case where the level of the MTF characteristic was divided into five levels $L_1$ to $L_5$ as shown in FIG. 8, the present invention can be also applied to the case where the number of levels is equal to or larger than two. The aperture pattern of the aperture diaphragm is not limited to the rectangular shape as shown in FIGS. 6A and 6B but can be also constructed by using a circular shape, an elliptic shape, or the like. The MTF characteristic in this case show a shape near a sine wave instead of the triangular shape shown in FIG. 7.

Figure 13:
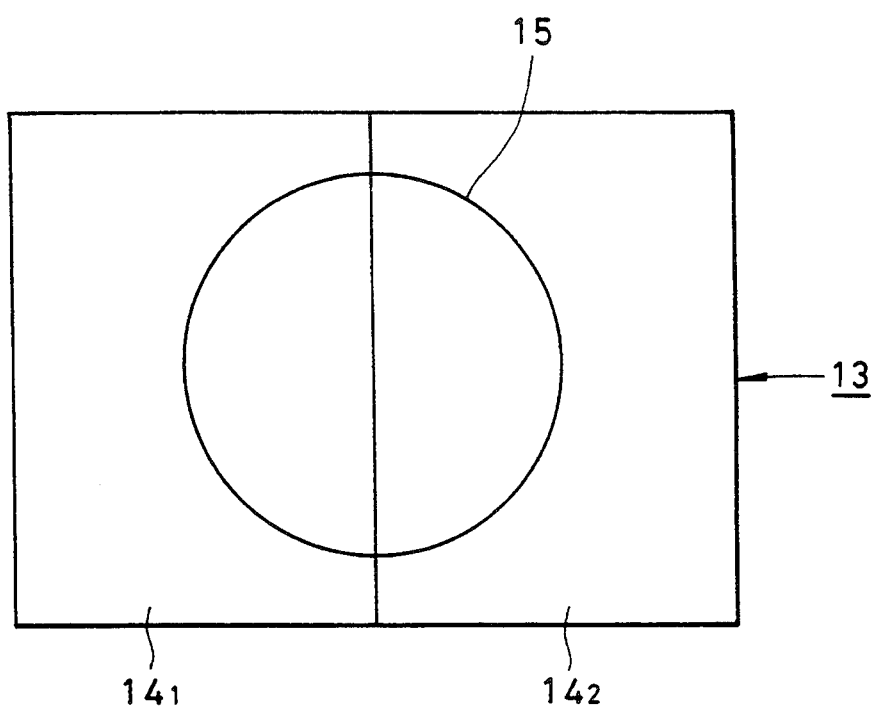
FIG. 13 is a diagram showing an example of a photodetector of the two-division type.
Figure 14:
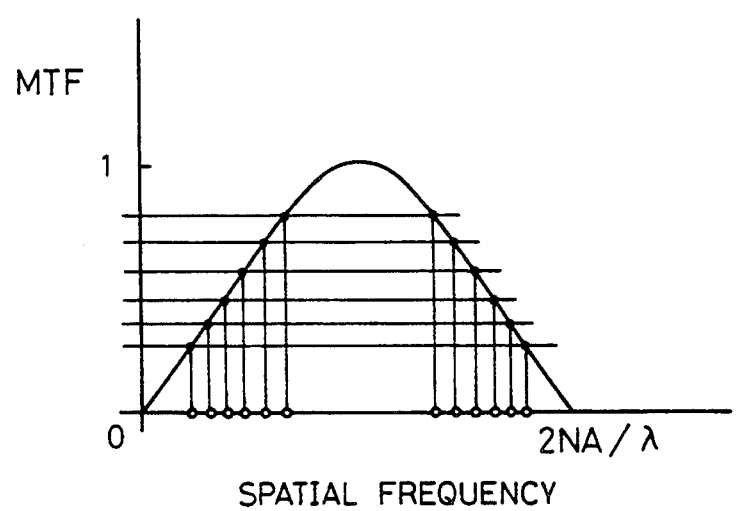
FIG. 14 is a diagram showing the MTF characteristic in case of using the photodetector of the two-division type.

In the second embodiment, a shape of the two-divided type shown in FIG. 13 can be used as a simplest shape of the detecting surface shape of the photodetector 13 also serving as a second aperture diaphragm. In FIG. 13, reference numerals $14_1$ and $14_2$ denote the two divided photodetecting elements and 15 indicates a light beam of the reflected light from the optical disc. It is known that when a difference between output signals of the two photodetecting elements $14_1$ and $14_2$ is obtained, the MTF characteristic is of a mountain-like shape having its peak at a position of about ½ of the cut-off frequency as shown in FIG. 14. To realize the present invention by using the MTF characteristic of FIG. 14, therefore, it is sufficient to divide the whole band below the cut-off frequency into two bands while setting the central peak position to a boundary and to set the spatial frequency corresponding to each level in each of the two bands.

The construction of the demodulating circuit which is used in the reproducing apparatus of the present invention is not limited to that described in FIG. 9 or 11. It is possible to use another construction such that all of the signals sent from the photodetector are first converted into the digital signals and, after that, all of the processes are executed by digital processes, or the like. The present invention can be applied to any circuit irrespective of the circuit construction so long as the pit signal recorded on the optical disc is demodulated on the basis of the MTF characteristic of the reproducing system.

In the embodiment, as an optical pickup, a so-called an infinite magnification optical system such that the laser beam emitted from the light source is once converted into the parallel light and the parallel light is converged by the objective lens is constructed, and the aperture diaphragm is arranged in the parallel light beam portion of the optical system. The position of the aperture diaphragm, however, can be set to an arbitrary position other than the light converging point of the lens. By arranging the aperture diaphragm to the converging beam position, an optical system of a so called finite system such that the laser beam emitted from the light source s directly used without converting into the parallel beam can be also constructed. Many variations are also possible with respect to the arrangements, shapes, and the like of the laser light source, half mirror, and the like.

As will be obviously understood from the above description, according to the optical information recording medium of the present invention, the pit length is set by using the whole band below the cut-off frequency of the MTF characteristic of the reproducing system. Information can, therefore, be recorded by using very many kinds of pits and the high density recording can be performed as compared with the conventional optical disc.

According to the reproducing apparatus of the optical information recording medium of the present invention, since the signal read out from the optical information recording medium is demodulated by using two values of the pulse width and amplitude value, a degree of allowance for the jitter is higher than that in case of the conventional apparatus in which the pit length is detected only along the time base. Many kinds of pits which have been recorded at a high density can be reproduced without errors.

What is claimed is:

1. An apparatus for recording information on an optical information recording medium used in a reproducing system by placing at least one pit having a pit length on the optical information recording medium wherein the pit length is one of a plurality of allowed pit lengths, comprising:
    means for determining a spatial frequency transfer characteristic of the reproducing system;
    means for dividing the spatial frequency transfer characteristic below a cut-off frequency into a plurality of bands;
    means for allocating a spatial frequency to each of said plurality of bands; and
    means for assigning an allowed pit length to each of said plurality of allocated spatial frequencies.

2. An apparatus for recording information on an optical information recording medium as recited in claim 1, wherein
    the means for dividing the spatial frequency transfer characteristic divides said spatial frequency transfer characteristic into a plurality of bands wherein each of said plurality of bands is bounded by a peak and a valley of the spatial frequency transfer characteristic.

3. A method for recording information on an optical information recording medium used in a reproducing system by placing at least one pit having a pit length on the optical information recording medium wherein the pit length is one of a plurality of allowed pit lengths, comprising the steps of:
- determining a spatial frequency transfer characteristic of the reproducing system;
- dividing the determined spatial frequency transfer characteristic below a cut-off frequency into a plurality of bands;
- allocating a spatial frequency to each of said plurality of bands; and
- assigning an allowed pit length to each of said plurality of allocated spatial frequencies.

4. A method for recording information on an optical information recording medium as recited in claim 3, wherein each of said plurality of bands is bounded by a peak and a valley of the spatial frequency transfer characteristic.

5. A method for determining a plurality of allowable pit lengths for recording information on an optical information recording medium in a reproducing system, comprising the steps of:
- determining a spatial frequency transfer characteristic of the reproducing system;
- dividing the determined spatial frequency transfer characteristic below a cut-off frequency into a plurality of bands;
- allocating a spatial frequency to each of said plurality of bands; and
- assigning an allowed pit length to each of said plurality of allocated spatial frequencies.

6. A method for determining a plurality of allowable pit lengths for recording information as recited in claim 5, wherein each of said plurality of bands is bounded by a peak and valley of the spatial frequency transfer characteristic.

7. An optical information reproducing apparatus for reproducing information recorded on an optical information recording medium using a plurality of pits, wherein each of said plurality of pits has an allowed pit length, said allowed pit length is one of a plurality of allowed pit lengths, and said plurality of allowed pit lengths is determined by determining a spatial frequency transfer characteristic of the reproducing apparatus, dividing the spatial frequency transfer characteristic below a cut-off frequency into a plurality of bands wherein each of said plurality of bands is bounded by a peak and a valley of the spatial frequency transfer characteristic, allocating a spatial frequency to each of said plurality of bands, and assigning an allowed pit length to each of said plurality of allocated spatial frequencies, the apparatus comprising:
- an optical pickup unit that reads out recorded information from said optical recording medium; and
- a signal demodulating circuit for demodulating original data by using pulse widths and amplitude values of a reproduction signal which is supplied from said optical pickup unit.

8. An optical information reproducing apparatus for reproducing information as recited in claim 7 wherein, said optical pickup unit has a spatial frequency transfer characteristic having at least one peak at a certain frequency position.

9. An optical information reproducing apparatus for reproducing information as recited in claim 7, wherein said optical pickup unit comprises:
- a first aperture diaphragm; and
- a second aperture diaphragm different from said first aperture diaphragm.

* * * * *